United States Patent [19]

Short et al.

[11] Patent Number: 4,532,182
[45] Date of Patent: Jul. 30, 1985

[54] SILICON CARBIDE WHISKER SHEET COMPOSITES

[75] Inventors: Lewis A. Short, Piedmont; Ottis J. Horne, Greer, both of S.C.

[73] Assignee: Atlantic Richfield Company, Los Angeles, Calif.

[21] Appl. No.: 335,449

[22] Filed: Dec. 29, 1981

[51] Int. Cl.³ .................... B32B 17/12; B32B 13/14
[52] U.S. Cl. ................................ 428/367; 428/368; 428/411.1; 428/428; 428/450; 428/446; 428/698; 428/902
[58] Field of Search ............ 428/902, 549, 411, 367, 428/368, 698, 450, 446, 428; 75/229; 423/345

[56] References Cited

U.S. PATENT DOCUMENTS

| | | | |
|---|---|---|---|
| 3,455,662 | 7/1969 | Alexander | 428/902 |
| 3,476,641 | 11/1969 | Milewski | 428/902 |
| 3,676,293 | 7/1972 | Gruber | 428/368 |
| 3,692,478 | 9/1972 | Knippenberg | 423/345 |
| 3,754,076 | 8/1973 | Cutler | 423/345 |
| 4,259,112 | 3/1981 | Dolowy | 75/229 |

FOREIGN PATENT DOCUMENTS 998166 7/1965 United Kingdom ............... 423/345

Primary Examiner—Ellis P. Robinson
Attorney, Agent, or Firm—James W. McClain; Stanley A. Becker; Blucher S. Tharp

[57] ABSTRACT

A sheet comprising a uniformly dispersed coating of silicon carbide whiskers is produced by: (a) deagglomerating a whisker mass; (b) forming a slurry of deagglomerated whiskers; (c) coating the slurry upon a clean surface of the sheet; and (d) driving off the solvent of the slurry.

10 Claims, 2 Drawing Figures

SILICON CARBIDE WHISKER SHEET COMPOSITES

FIELD OF THE INVENTION

The invention relates to silicon carbide reinforced sheet composites, and more particularly to a method, and resultant article of the method, wherein silicon carbide whiskers are uniformly dispersed and/or distributed upon a thin sheet.

BACKGROUND OF THE INVENTION

For many years, it has been recognized that metals, plastics and other medium and low strength materials could be reinforced with silicon carbide whiskers. These whiskers are small fibers, which can be mixed with the powdered metal or plastic to form a composite material, or which can be coated upon a thin sheet of metal, plastic or ceramic.

The silicon carbide whiskers are obtained by well-known processes, such as by reacting coked rice hulls, a throw-away byproduct of rice production, as is taught in U.S. Pat. No. 3,754,076 issued Aug. 21, 1973 to Cutler.

The whiskers, being a fibers with anisotropic properties, are used to greatly reinforce and improve the mechanical properties of other materials.

While the advantages of utilizing these whiskers are well-known, it has been very difficult to properly mix these whiskers with other substances due to their initial agglomerated state. The mass of agglomerated whiskers when mixed with other materials will produce a non-homogeneous composite of lower mechanical strength.

In order to achieve the maximum benefits of whisker reinforcement, it is necessary to thoroughly and uniformly disperse and/or distribute the whiskers. Such dispersion requires thorough deagglomeration and mixing without substantial damage to the whiskers.

It has been taught in the prior art that mixing whiskers with matrix material and a non-polar solvent containing a polymeric binder can provide a random distribution of whiskers in the matrix. Such a teaching is shown in U.S. Pat. No. 4,259,112, issued Mar. 30, 1981.

While U.S. Pat. No. 4,259,112 asserts being able to achieve a homogeneous composite, this homogeneity is not free of agglomerates as is the present invention.

Expressed in another way, the U.S. Pat. No. 4,259,112 does not teach deagglomerating the whisker mass. These agglomerates can seriously detract from mechanical performance.

In patent application U.S. Ser. No. 274,256, filed June 16, 1981, it is taught that the agglomerated whisker mass can be deagglomerated prior to mixing by treating it with a polar solvent and milling the solvated mass into a deagglomerated slurry. Alcohols, water, ketones and other organic solvents are good polar solvents for this purpose. These directionally charged solvents are believed to work by reason of their ability to neutralize the statically charged whiskers of the agglomerated mass. This neutralization allows the whiskers to separate, i.e. deagglomerate, upon subsequent milling of the slurry.

It has been discovered by the present inventors that a second slurry of previously deagglomerated whiskers will provide a further dispersion of the whiskers.

When this second slurry of deagglomerated whiskers is then coated upon a sheet, and the slurry is dried, a highly homogeneous, uniformly dispersed whisker and sheet composite is achieved, which is substantially free of agglomerates. The whiskers will adhere to the sheet by static and/or molecular attraction.

The above deagglomerating process has produced aluminum sheet composites of superior uniformity. This is the first time to the best of our knowledge and belief, anyone has been able to consistently achieve a uniform aluminum sheet and silicon carbide whisker composite.

BRIEF SUMMARY OF THE INVENTION

The invention pertains to a composite sheet comprising sheets coated with deagglomerated silicon carbide whiskers substantially, uniformly and homogeneously dispersed and distributed thereon, which provide reinforcement to the composite.

For the purpose of definition, the term "whiskers" shall mean fibers, filaments or acicular particles or mixtures thereof, which may be uniformly dispersed upon a sheet by method or methods herein disclosed or suggested.

The composite material is derived from the process of: (a) deagglomerating a mass of silicon carbide whiskers by forming a first slurry; (b) coating a sheet with a second slurry of the deagglomerated whiskers; and (c) forming a sheet composite by driving off the slurry solvent.

A polar solvent, such as alcohol, water, ketones, or other organic solvents, must be used in forming the first slurry of deagglomerated whiskers, and can also be used to form the second slurry of the deagglomerated whiskers in order to facilitate the coating of the whiskers upon the sheet.

The sheet material may be aluminum, magnesium, titanium, zinc, tin, iron, nickel, antimony, lead, copper, or alloys thereof, glass, plastic, ceramic, etc.

When a composite is fabricated, silicon carbide whiskers can be added in an approximate range of from 0.001 to 50 percent by volume of the total volume of the sheet.

Preferably about 5 to 30 percent by volume of whiskers are added to the sheet.

It is an object of the invention to provide an improved process and article of manufacture comprising a composite having a silicon carbide whisker coating on a sheet.

It is another object of this invention to provide a composite having deagglomerated silicon carbide whiskers coated upon a sheet. The whiskers are substantially, uniformly and homogeneously distributed and/or dispersed upon the sheet.

These and other objects of the invention will be better understood and will become more apparent with reference to the following detailed description considered in conjunction with the accompanying drawings.

DETAILED DESCRIPTION OF THE INVENTION

Generally speaking, the invention pertains to a process and resultant article of manufacture, wherein a thin coating of silicon carbide whiskers is applied to the surface of a sheet of material. Thin sheets or foils having silicon carbide whiskers coated thereon are useful in the further manufacture of laminates and composites. The interspersed whiskers reinforce composites made from the thin sheet materials by adding strength and rigidity to the overall structure.

Figure 1:
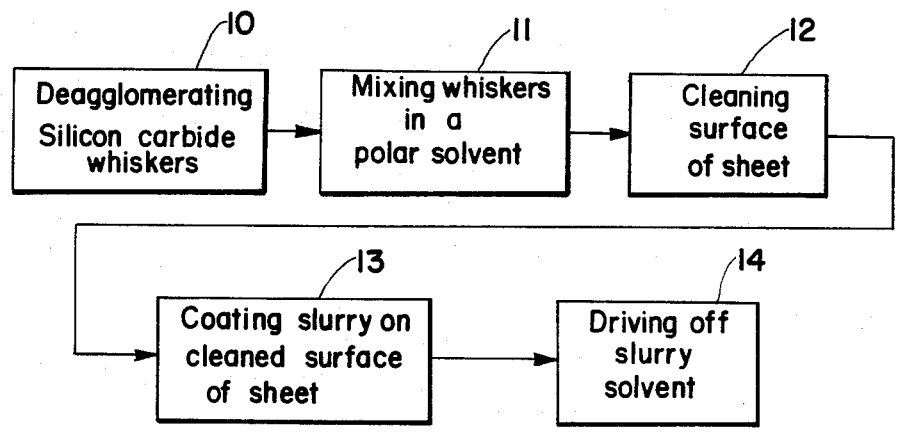
FIG. 1 is a flow diagram of the process of this invention.

Now referring to FIG. 1, a schematic flow diagram of the inventive process is illustrated.

In Block 10, the silicon carbide whiskers are first deagglomerated by ball-milling the whiskers in a polar solvent, such as ethanol or butanol, for approximately one hour. The deagglomerating process removes clumps from the silicon carbide whisker mass, and produces a more uniform and homogeneous blend of whisker material. The slurry of dispersed whiskers are then dried until all the solvent is driven off.

Next, the deagglomerated whiskers are again slurried in a polar solvent such as acetone, and passed through a 100 mesh sieve, as depicted in Block 11. Screening the slurry removes the last traces of any agglomerates and further improves the texture and uniformity of the slurry.

In Block 12, the surface of the sheet material to be coated is cleaned. When the sheet is aluminum foil, a degreasing solvent such as methylene chloride can be used to remove oils or fingerprint residues.

The screened slurry is then poured upon the sheet surface and allowed to stand without disturbance, as shown in Block 13. After the solvent has evaporated, the sheet may be dried in an oven (Block 14) to remove any solvent residues. When dry, the sheet may be trimmed, shaped or laminated with other such sheets. The coated sheets make excellent "sandwich" type composites.

The whiskers adhere to the surface of the sheet by static and/or molecular attraction, without the aid of a binder. Binders are generally not preferred in laminates of this kind, because they tend to produce voids in the dispersion, and generally spoil the uniformity and homogeneity of the product. However, if so desired, binders can be used.

One advantage of using this process is that the density of the coating can be easily controlled.

Figure 2:
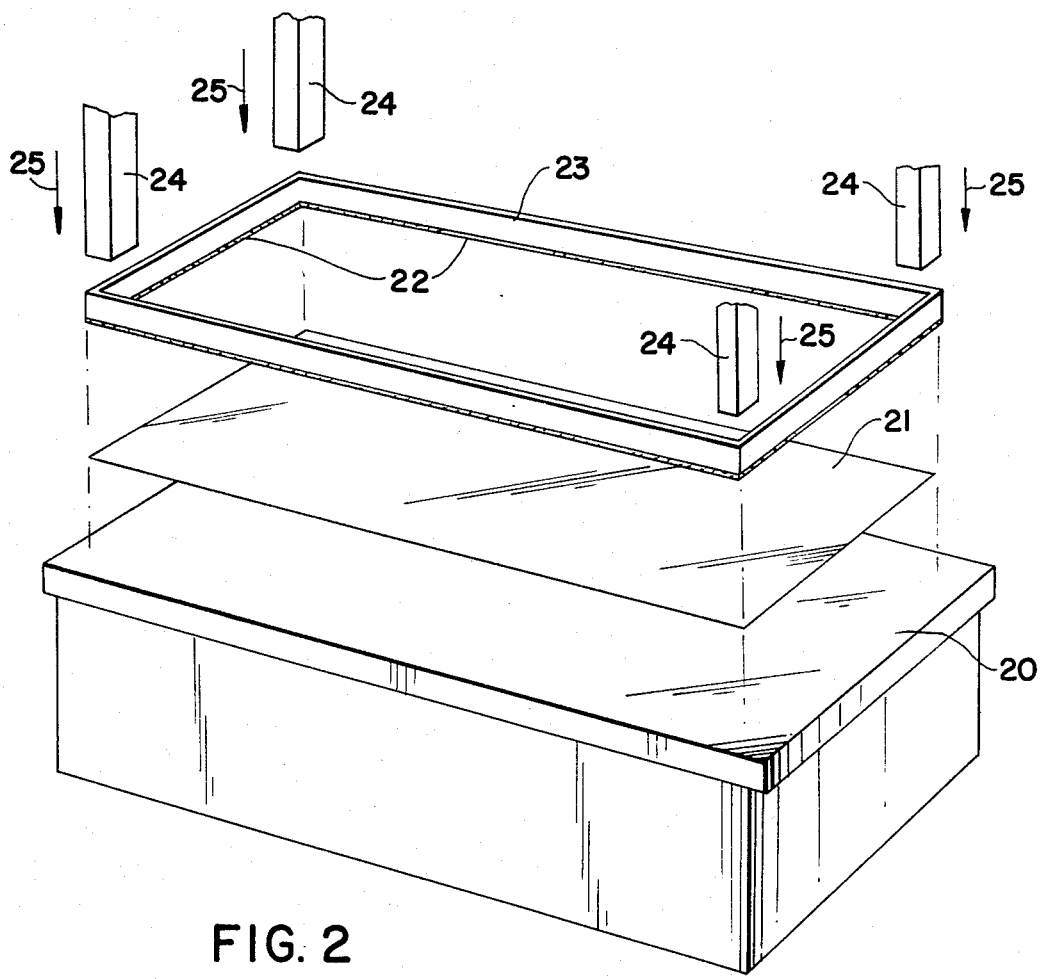
FIG. 2 is a schematic view of an apparatus for practicing the method illustrated in FIG. 1.

Referring to FIG. 2, a schematic view of a coating apparatus is illustrated for the process shown in FIG. 1.

The coating apparatus comprises a substantially flat and smooth support surface 20, upon which the sheet 21 to be coated is placed. If the sheet is a foil of aluminum, the sheet 21 is flattened upon support 20 to remove any wrinkles or entrapped bubbles in the sheet.

Once flattened, a gasket 22 is placed about the perimeter of the sheet 21. The gasket can be made of rubber or other liquid-tight material, which will provide a good liquid seal.

A metal frame 23 is then placed upon the gasket 22, and corner clamps 24 are applied (arrows 25) to the frame and sheet to effect a liquid seal.

The slurry of deagglomerated silicon carbide whiskers is then poured into frame 23 in accordance with the process of FIG. 1.

The following are actual examples of the invention:

EXAMPLE 1

A. Whisker Deagglomeration

Approximately 200 grams of SiC whiskers were added to one chamber of a vibratory ball mill along with approximately 3000 grams of ⅛" diameter steel balls. After adding 750 ml of ethanol, the mixture was vibrated for 1 hour. The resulting slurry was poured into trays and dried at 250° F. overnight in a recirculating oven. When completely dry, the resulting whisker cake was reduced in size using a twin shell blender equipped with an intensifier bar. Processing time for this operation was approximately 5 minutes. After size reduction, the whiskers were collected for subsequent coating processes.

B. Sheet Preparation

A sheet of aluminum alloy (6061) foil (2'×4'×0.001") was placed on a moistened, stable, flat table which had previously been levelled and the foil surface smoothed to remove trapped air bubbles. A gasket was then put in place around the perimeter of the foil and the frame placed on top of the gasket. After clamping the frame so as to form a liquid tight seal, the foil was cleaned with methylene chloride to remove any oil, grease, and/or dirt that could affect the coating.

C. Coating Preparation (no binder)

The coating slurry was prepared by adding 35 grams of deagglomerated whiskers, as prepared in 1-A, to approximately 3600 ml of acetone and stirring vigorously for approximately 15 minutes. The dispersion was then poured through a 100 mesh screeen and the few remaining +100 mesh whisker portions were removed.

The coating was done by pouring the −100 mesh dispersion onto the cleaned foil from above and allowing the acetone to evaporate. The result was a 22"×44" piece of foil with a visibly uniform layer of SiC whiskers adhered to the surface. After removing the frame and gasket, the foil was taken from the table top and dried an additional hour at 250° F. to ensure complete acetone removal. The final product was a uniformly SiC whisker coated foil which could be sized or used as prepared for processing into composite sheets, or other applications.

EXAMPLE 2

Coating Preparation (with binder)

The whiskers were deagglomerated and the sheet prepared in accordance with steps "A" and "B" of Example I above. The coating slurry was prepared by adding 2.17 g of deagglomerated whiskers to a mixture of 0.10 g of polyvinylbutyral resin in 300 ml of acetone. After stirring for 15 minutes, the slurry was poured through a 100 mesh screen to remove the few undispersed lumps. The −100 mesh slurry was then poured onto a degreased sheet of aluminum alloy (6061) foil (8"×8"×0.010") secured in a small pulp sheet former and the acetone allowed to evaporate. After acetone removal, a sheet containing a visibly uniform coating of SiC whiskers was obtained.

Having thus described this invention, what is desired to be protected by Letters Patent is presented by the following appended claims.

What we claim is:

1. A composite sheet comprising a planar sheet substrate of metal, glass, plastic or ceramic coated with interspersed silicon carbide whiskers on at least one surface thereof, said silicon carbide whiskers having previously been deagglomerated in a polar slurry and being substantially uniformly dispersed upon said surface of said substrate and adherent to said surface by static or molecular attraction without the presence of any binder.

2. A composite sheet as in claim 1 wherein said substrate is a metal.

3. A composite sheet as in claim 2 wherein said metal is aluminum, magnesium or an alloy thereof.

4. A metallic sheet having a substantially uniform dispersion of interspersed silicon whiskers on at least one surface thereof, said whiskers having previously been deagglomerated in a polar slurry and being adherent to said sheet by static or molecular attraction without the presence of any binder.

5. A metallic sheet as in claim 4 wherein the metal of said sheet is aluminum, magnesium or an alloy thereof.

6. A composite sheet comprising a planar sheet substrate of metal, glass, plastic or ceramic having a substantially uniform distribution of interspersed silicon carbide whiskers dispersed upon at least one surface thereof and adherent to said surface by static or molecular attraction without the presence of any binder, said whiskers derived from the process of:

(a) deagglomerating said silicon carbide whiskers;
(b) preparing a slurry of said deagglomerated whiskers;
(c) coating at least one surface of said substrate with said slurry; and
(d) drying said coating.

7. The sheet of claim 6, wherein said sheet comprises a plastic material.

8. The sheet of claim 6, wherein said sheet comprises a ceramic material.

9. A composite sheet as in claim 6 wherein said substrate is a metal.

10. A composite sheet as in claim 9 wherein said metal is aluminum, magnesium or an alloy thereof.

* * * * *